Jan. 30, 1951   J. A. JAWETT ET AL   2,539,665
LIQUID TYPE INDICATING GAUGE
Filed Feb. 15, 1949   2 Sheets-Sheet 1
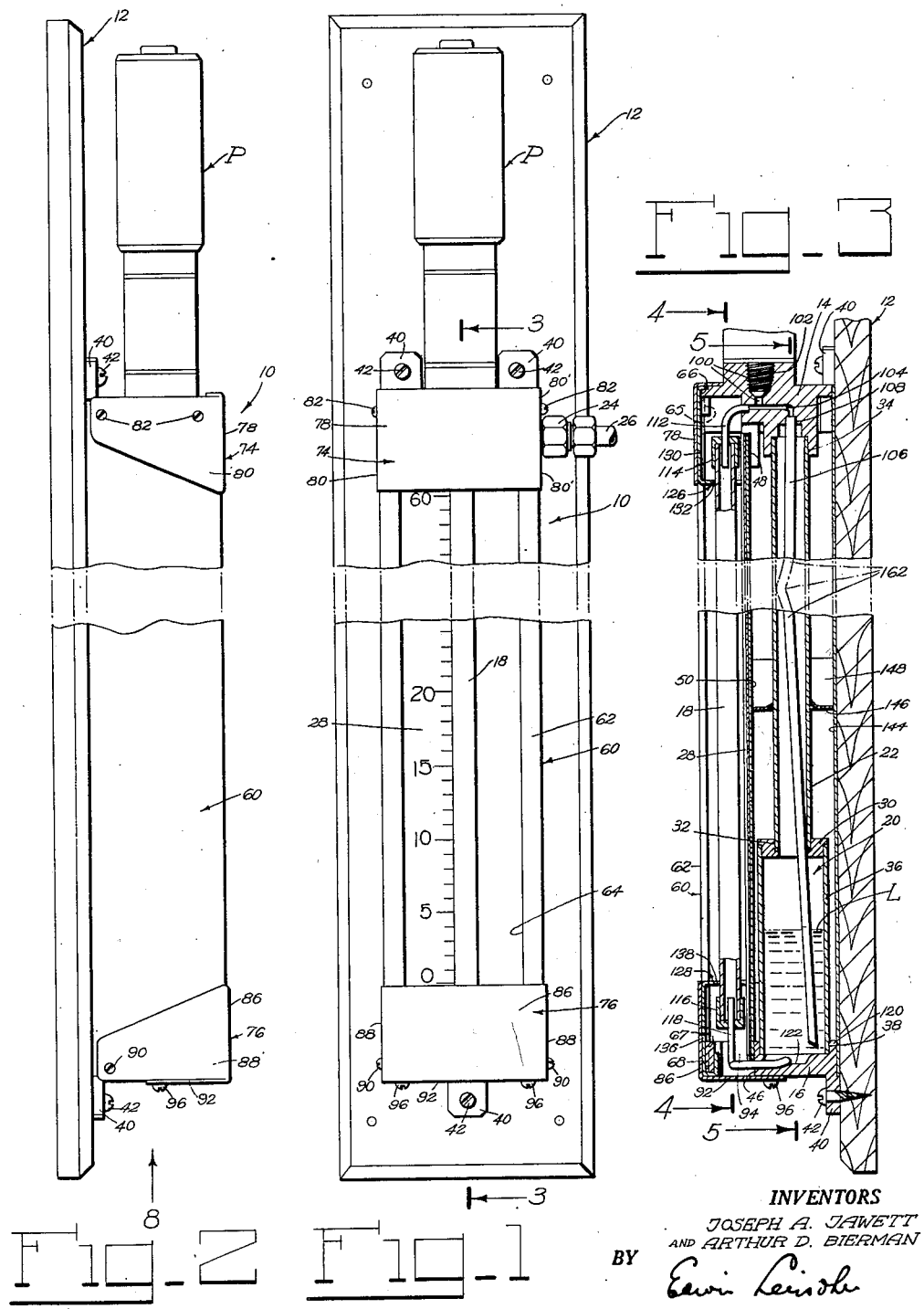
INVENTORS
JOSEPH A. JAWETT
AND ARTHUR D. BIERMAN
BY
Edwin Leinok
ATTORNEY

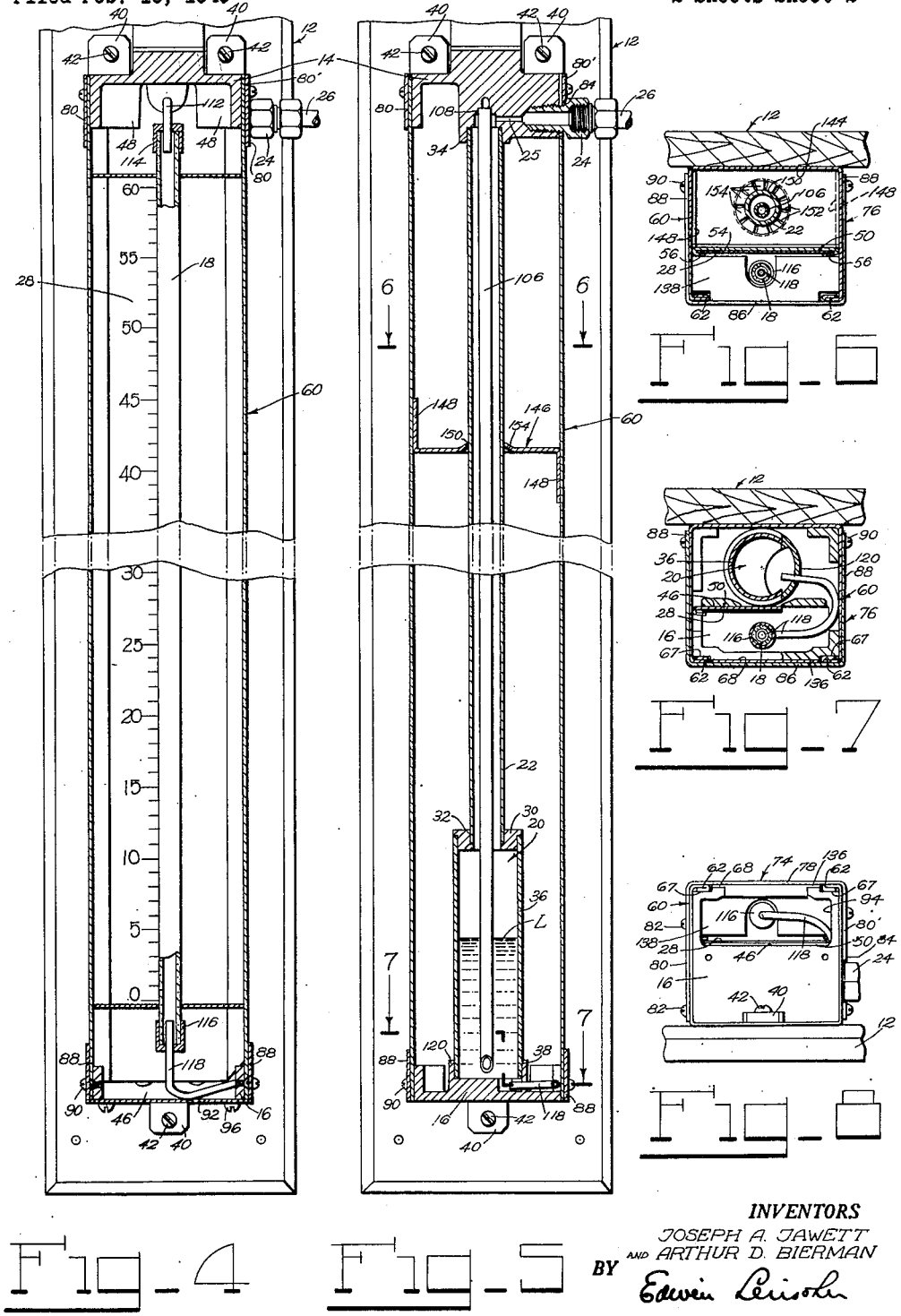

Patented Jan. 30, 1951

2,539,665

UNITED STATES PATENT OFFICE 2,539,665

LIQUID TYPE INDICATING GAUGE

Joseph A. Jawett, Jamaica, and Arthur D. Bierman, Malverne, N. Y., assignors to Liquidepth Indicators Incorporated, Long Island City, N. Y., a corporation Application February 15, 1949, Serial No. 76,446

7 Claims. (Cl. 73—323)

This invention relates to pressure gauges, and more particularly to liquid-type gauges which are used to indicate the content of liquid-holding tanks, for instance.

Gauges of this type may be used, for instance, to indicate the hydrostatic pressure of a liquid supply in a tank by the displacement in a transparent indicator tube of the gauge of a column of indicating liquid by the well known expediency of the air pressure in a conventional air bell in the liquid supply. The hydrostatic pressure may, for convenience, be converted on a scale into units of measurement to indicate the liquid content of the tank, as in feet of liquid depth, for instance, opposite the level of the liquid column in the indicator tube of the gauge. For accurate indications by the gauge, the air bell has to be aerated from time to time to expel therefrom liquid that entered from the tank, and this is customarily accomplished by forcing compressed air through the gauge into the air bell.

It is the primary aim and object of the present invention to provide a gauge of this type which is readily assembled from relatively simple and inexpensive parts into a sturdy, yet light weight construction, and which readily lends itself to disassembly for the repair or replacement of any part or parts thereof.

It is another important object of the present invention to provide in a gauge of this type a by-pass around the indicator tube for the passage through the gauge of compressed air for aerating purposes, without materially adding to the construction of the gauge and without offering any more possibilities for leakage of air or indicating liquid from the gauge than if the by-pass were omitted.

It is another important object of the present invention to provide a gauge of this type with facilities for ready exchange of indicator scales so as quickly to adapt the gauge to different liquids, or to the same liquids of different specific gravities, in the tank.

The above and other objects, features and advantages of the present invention will be more fully understood from the following description considered in connection with the accompanying illustrative drawings.

In the drawings:

Fig. 1 is a front elevational view of a gauge embodying the present invention;

Fig. 2 is a side elevational view of the gauge;

Fig. 3 is a section taken on the line 3—3 of Fig. 1;

Figs. 4 and 5 are sections taken on the lines 4—4 and 5—5, respectively, of Fig. 3;

Figs. 6 and 7 are sections taken on the lines 6—6 and 7—7, respectively, of Fig. 5; and Fig. 8 is a bottom view of the gauge as viewed in the direction of the arrow 8 in Fig. 2, a certain part being removed for better illustration of structure normally hidden thereby.

Referring to the drawings, and more particularly to Figs. 1 and 2 thereof, the reference numeral 10 designates a gauge which is preferably mounted on a board 12 that is, in turn, mountable on a wall or other support on which the gauge is to be read. As best shown in Figs. 3 to 5, the gauge comprises top and bottom brackets 14 and 16, respectively, an indicator tube 18 of any suitable transparent material, such as glass, for instance, a reservoir 20 for holding the indicating liquid used in the gauge, an air tube 22 which is in open communication with the reservoir 20, and a fitting 24 which, through a passage 25 in the top bracket 14, provides communication between an air line 26 and the air tube 22. The gauge further comprises a scale 28 against which the level of the indicating liquid in the indicator tube 18 is to be read, and the graduations of which may denote, for instance, inches of liquid depth in a tank having near the bottom thereof a conventional air bell (not shown) that is in communication with the gauge through the air line 26.

The air tube 22, which is preferably metallic, is permanently connected at one end with the end cover 30 of the reservoir 20 by being brazed or otherwise secured therein as at 32. The other end of the air tube 22 is brazed or otherwise secured in an annular recess 34 in the top bracket 14. The cylindrical side wall of the reservoir 20 is, in the present instance, formed by a preferably metallic tube 36 which is permanently secured, as by brazing, to the end cover 30, as well as in an annular recess 38 in the bottom bracket 16. Thus, the top and bottom brackets 14 and 16, the air tube 22, and the reservoir 20 form a rigid unit. The top and bottom brackets 14 and 16 are preferably provided with lugs 40, respectively, which serve for the mounting of the gauge on the board 12 by means of screws 42 or the like.

Held against a face 46 of the bottom bracket 16 and against undercut lugs 48 of the top bracket 14, in a manner to be described, is a holder 50 for the scale 28 (Fig. 3). The scale 28 may be in the form of a paper or cardboard strip having graduations imprinted thereon. The scale holder 50 may be made of sheet metal formed into the cross-sectional shape shown in Fig. 6, and comprises a web 54 on which the scale 28 rests, and inwardly turned side margins 56 which form a guideway for the scale 28.

The above-described unit 14, 16, 20 and 22 is enclosed in back and on the opposite sides in a shell 60 which is preferably made sheet metal formed into the cross-sectional shape shown in Fig. 6 and being open at the top and bottom of the gauge. The shell 60 is at its open front provided with inwardly bent margins 62 that form the sides of a window 64 of pleasing appearance (Fig. 1) through which to observe the scale 28 as well as the indicator tube 18 of the gauge. The top and bottom brackets 14 and 16 of the gauge fit fairly accurately in the shell 60 (Figs. 3 to 8), and the bent margins 62 of the shell 60 preferably rest against cut-away side margins 65 and 67 of the front faces 66 and 68 of the top and bottom brackets 14 and 16, respectively (Figs. 3, 7 and 8).

The unit 14, 16, 20 and 22 is releasably held in place in the shell 60 by means of top and bottom caps 74 and 76, respectively, which may also be made of sheet metal and formed into general U-shape. The yoke portion 78 of the top cap 74 overlies the front face 66 of the top bracket 14 and the adjacent bent margins 62 of the shell 60, while the opposite legs 80 of the top cap 74 straddle the adjacent sides of the shell 60 and are secured thereto and to the adjacent sides of the top bracket 14 by screws 82, for instance. The leg 80' of the top cap 74 is notched as at 84 (Fig. 5) to clear the fitting 24. The yoke portion 86 of the bottom cap 76 extends over the front face 68 of the bottom bracket 16 and the adjacent bent margins 62 of the shell 60, while the opposite legs 88 of the bottom cap 76 straddle the adjacent sides of the shell 60 and are secured thereto and to the adjacent sides of the bottom bracket 16 by screws 90, for instance. The yoke portion 86 of the bottom cap 76 is preferably provided with an inwardly bent extension 92 (Figs. 2 and 3) which normally covers an aperture 94 in the bottom bracket 16 and may be secured to the latter by screws 96, for instance. The aperture 94 in the bottom bracket 16 is of the shape shown in Fig. 8, permitting the scale 28 to be slid into and from the scale holder 50 through the bottom bracket 16 when the bottom cap 76 is removed, as will be readily understood.

Suitably mounted on, and communicating with a chamber 100 in the top bracket 14, is a preferably hand-operated pump P which serves for the purpose of aerating the previously mentioned air bell by forcing atmospheric air through the gauge and the air line 26. This pump may be exactly like that shown and described in the co-pending application of Daniel H. Bierman and Joseph A. Jawett, Serial No. 23,574, filed April 27, 1948, wherefore the pump P requires no further description, particularly since the same forms no part of the present invention. The pump P may have a threaded outlet 102 by means of which the former is conveniently mounted on the bracket 14 (Fig. 3).

The chamber 100 in the top bracket 14 communicates with a duct 104, one end of which is in permanent communication with a conduit 106 that extends through the air tube 22 and into the indicating liquid L in the reservoir 20. The tube 106 is with its top end brazed or otherwise secured in a bore 108 in the top bracket 14, and thus becomes a part of the earlier described unit 14, 16, 20 and 22. Brazed or otherwise secured in the other end of the duct 104 in the top bracket 14 is a relatively small tube 112 carrying a cup 114 (Fig. 3). Secured in the cup 114 as by a suitable cement, is the top end of the transparent indicator tube 18, the lower end of which is similarly secured in a cup 116 carried by a relatively small tube 118 (Fig. 3). The lower tube 118 extends into the interior of the reservoir 20 through a cylindrical wall 120 provided by the bottom bracket 16 (Figs. 5 and 7). Preferably, the tube 118 projects into a depressed portion 122 in the bottom bracket 16 so as to be in communication with the liquid in the reservoir 20 at the lowest point in the latter. The lower tube 118 is, as best shown in Fig. 8, so bent around the scale holder 50 as not to interfere with the described placement of the scale 28 into, or its removal from, the scale holder through the bottom bracket 16.

The scale holder 50 is held against the face 46 of the bottom bracket 16 and against the undercut lugs 48 of the top bracket by brackets 126 and 128, respectively. Both brackets are preferably made from sheet metal and formed into general L-shape (Fig. 3). The bracket 126 has one leg 130 thereof interposed between the yoke portion 78 of the top cap 74 and the adjacent front face 66 of the top bracket 14, while the other leg 132 thereof engages the scale holder 50 and is notched at 134 to clear the indicator tube 18. The other bracket 128 has one leg 136 thereof interposed between the yoke portion 86 of the bottom cap 76 and the adjacent front face 68 of the bottom bracket 16, while the other leg 138 engages the scale holder 50 and is notched at 140 to clear the indicator tube 18. The legs 132 and 138 of the top and bottom caps 74 and 76, respectively, extend also underneath the bent margins 62 of the shell 60 in the fashion shown in Fig. 6. The legs 132 and 138 of the top and bottom caps 74 and 76, respectively, by straddling the indicator tube 18 in the fashion best shown in Fig. 6, also prevents accidental bending of the relatively weak tubes 112 and 118 and according lateral displacement of the indicator tube 18 from its correct position relative to the scale 28.

Since the scale holder 50 is relatively long, and may for its intended purpose be made from relatively weak sheet metal, it is advisable to brace the scale holder at least once in its longitudinal extent. To this end, there is interposed between the rear wall 144 of the shell 60 and the scale holder 50 a brace 146 of sheet metal, or the like (Fig. 3). The brace 146 may further be provided with bent margins 148 (Fig. 5) that are adapted to bear against the adjacent side walls of the shell 60, thereby also reinforcing the latter. The brace 146 is provided with an aperture 150 through which the air tube 22 extends. Preferably, the brace 146 is around the aperture 150 therein radially slotted as at 152 (Fig. 6) to form a plurality of prongs 154 that engage the air tube 22 in a somewhat yielding fashion and thus retain the brace 146 in any position along the air tube 22 into which it is shifted in the assembly of the gauge.

The conduit 106 is preferably a metallic tube of some slight resiliency. In order to prevent destruction of the hermetic seal between the top end of the conduit 106 and the bore 108 in the top bracket 14 (Fig. 3) on even slightly jarring the gauge, the conduit 106 is so bent in the air tube 22 as at 162, for instance, that the same is yieldingly clamped in the air tube 22.

The instant gauge is noteworthy for its simplicity of construction. Thus, the unit 14, 16, 20, 22 and 106 involves simple parts that may readily be pre-assembled while the remainder of the gauge consists of simple, formed sheet metal stampings and such simple parts as the mounting board 12, the indicator tube 18, the standard fitting 24, and simple tube connections. The instant gauge is also noteworthy for the ready assembly of the unit 14, 16, 20, 22 and 106 with the remaining parts of the gauge, and the correspondingly facile disassembly of the parts from the referred unit for the repair of the gauge or the replacement of defective parts. Another noteworthy feature of the instant gauge lies in the ready interchangeability of scales without having to dismantle the gauge beyond removing the bottom cap 76. By using sheet metal stampings to the extent described, the gauge is also of relatively light weight and little bulk, yet is sturdy in construction and highly efficient in operation.

While we have shown and described the preferred embodiment of our invention, it will be understood that various changes may be made in the present invention without departing from the underlying idea or principles of the invention within the scope of the appended claims.

Having thus described our invention, what we claim and desire to secure by Letters Patent, is:

1. A gauge, comprising a unit providing spaced brackets, and a tubular member connecting said brackets, a sheet metal shell enclosing said unit on the back and opposite sides and being open at both ends and at the front, a scale extending substantially parallel to said tubular member between the latter and the open front of said shell and concealing said tubular member from the front, a transparent indicator tube extending substantially parallel to said scale between the latter and the open front of said shell and being connected at its opposite ends with said brackets, respectively, and caps releasably secured to said brackets, respectively, said caps closing the adjacent ends, respectively, of said shell and concealing the adjacent brackets, respectively.

2. A gauge as set forth in claim 1, further comprising a sheet metal brace in said shell extending behind said scale transversely of said tubular member and yieldingly engaging the opposite sides, respectively, of said shell.

3. A gauge as set forth in claim 1, further comprising a sheet metal brace in said shell extending transversely of said tubular member between said scale and the back of said shell and yieldingly engaging the opposite sides, respectively, of said shell, said brace having an aperture through which said tubular member extends.

4. A gauge as set forth in claim 1, further comprising a sheet metal brace in said shell extending transversely of said tubular member between said scale and the back of said shell and engaging the opposite sides, respectively, of said shell, said brace having an aperture through which said tubular member extends and the edge of said aperture being slit at spaced points to provide prongs yieldingly engaging said tubular member.

5. A gauge as set forth in claim 1, further comprising a holder for said scale into which the latter is longitudinally slidable, means for supporting said holder in said shell, one of said brackets having an aperture through which to slide said scale into said holder, and the cap adjacent said one bracket covering said aperture in said one bracket.

6. A gauge, comprising a unit providing spaced brackets and a tubular member connecting said brackets and forming a reservoir at its lower end adjacent one of said brackets, a sheet metal shell enclosing said unit on the back and on the opposite sides and being open at both ends and at the front, a scale, a holder for said scale into which the latter is longitudinally slidable, means for supporting said holder in said shell in covering relation with said tubular member, a transparent indicator tube extending substantially parallel to said scale between the latter and the open front of said shell and being connected at one end with the other of said brackets, caps releasably secured to said brackets, respectively, said caps closing the adjacent ends, respectively, of said shell and concealing the adjacent brackets, respectively, and a tubular element connecting the other end of said indicator tube with said reservoir, said tubular element being bent around one side of said holder so as to be out of the path of the scale when slid into said holder, and said one bracket having an aperture through which to slide said scale into said holder.

7. A gauge comprising spaced brackets, one of said brackets having an interior passageway and an inlet to said passageway, and a tubular member extending between said brackets and mounted therein, said member being closed at the end thereof nearest said one bracket, part of said member including the end thereof remote from said one bracket being adapted to serve as a reservoir for indicating liquid, said other bracket constituting a portion of said reservoir, an inlet for said member including an additional passageway defined in said one bracket, a transparent indicator tube extending substantially parallel to said member and communicating at one end with said first-mentioned passageway and at the other end with said reservoir, and a conduit disposed in said member, one end of said conduit being in communication with said first-mentioned passageway and the other end of said conduit extending into said reservoir, said conduit being a metallic tube of smaller cross-sectional area than said tubular member and being bent in the latter so as to be in yielding engagement with longitudinally spaced, opposite peripheral portions of said tubular member.

JOSEPH A. JAWETT.
ARTHUR D. BIERMAN.

REFERENCES CITED

The following references are of record in the file of this patent:

UNITED STATES PATENTS

| Number | Name | Date |
|---|---|---|
| 795,833 | House | Aug. 1, 1905 |
| 2,032,681 | Zenner | Mar. 3, 1936 |